United States Patent Office 2,907,938
Patented Oct. 6, 1959

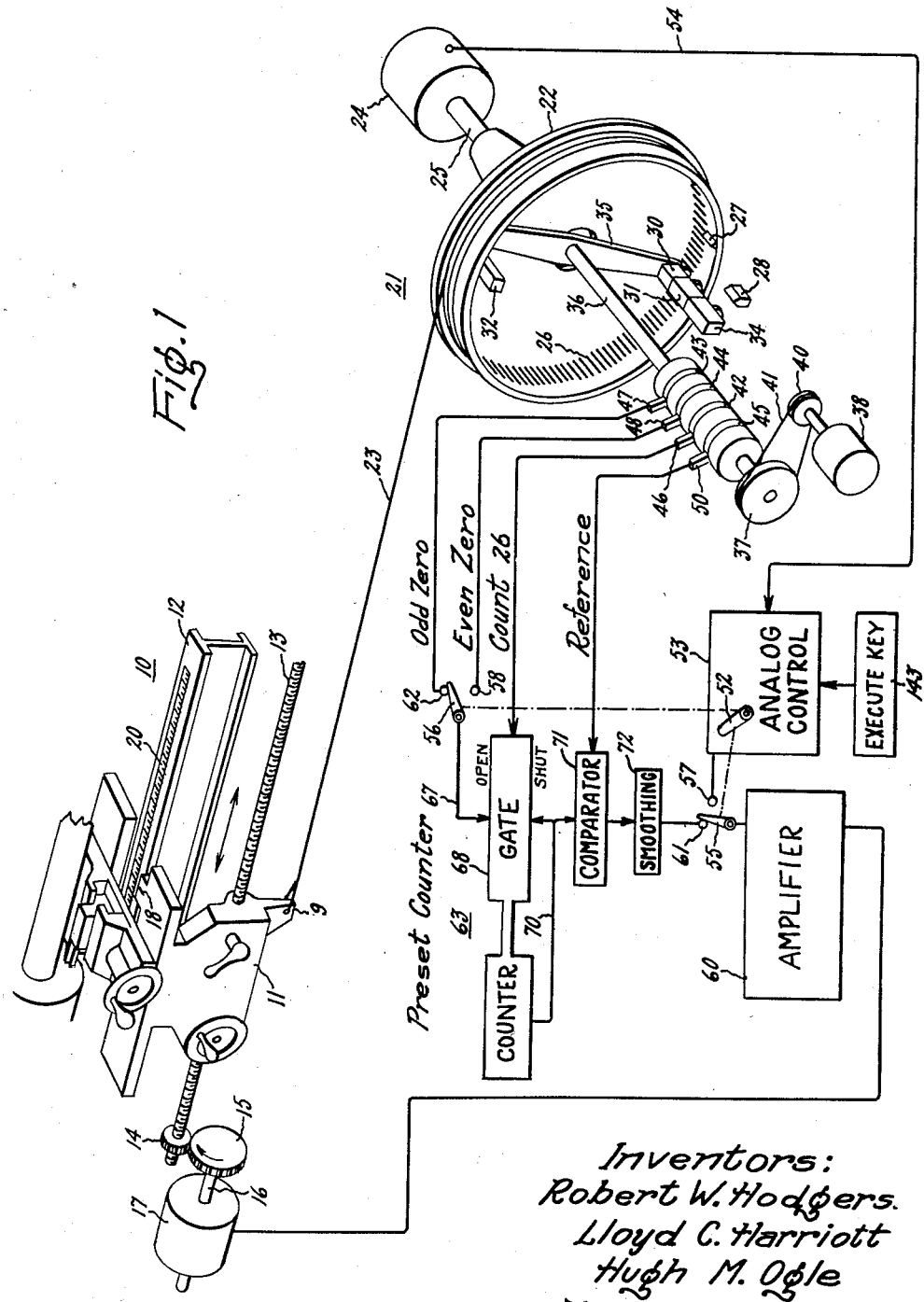

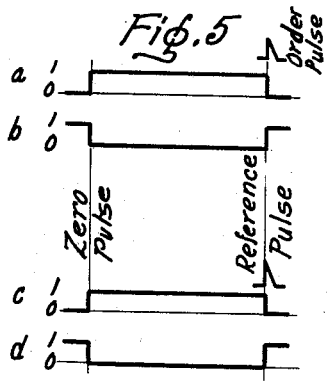
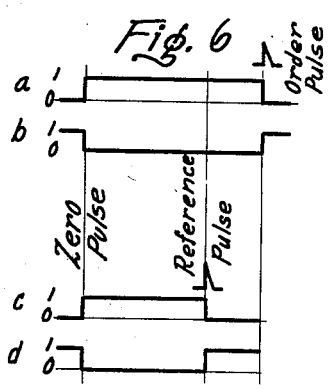
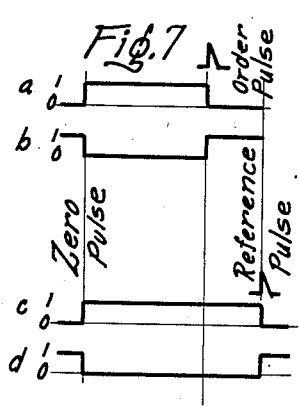
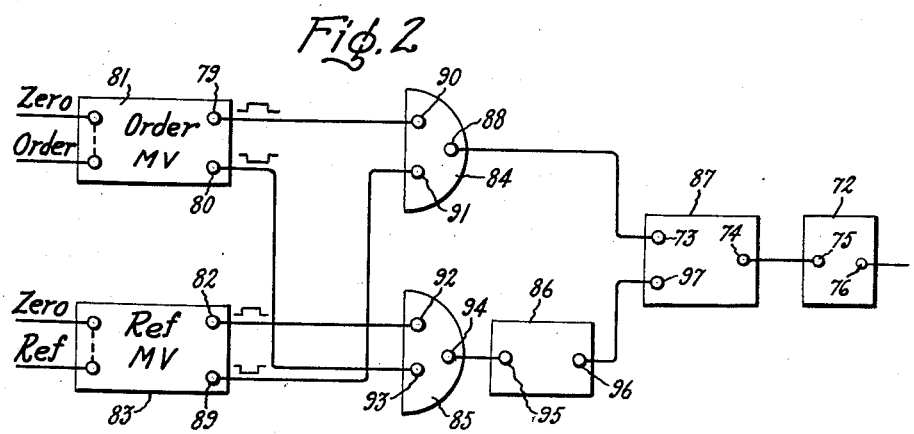
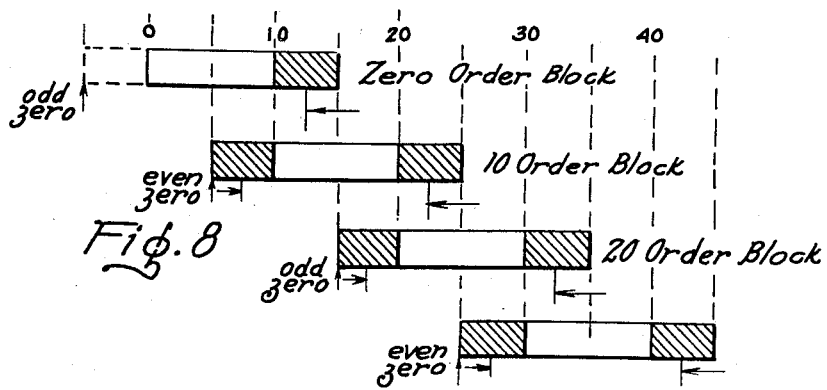
Inventors:
Robert W. Hodgers.
Lloyd C. Harriott
Hugh M. Ogle
by Merton D. Moore
Their Attorney

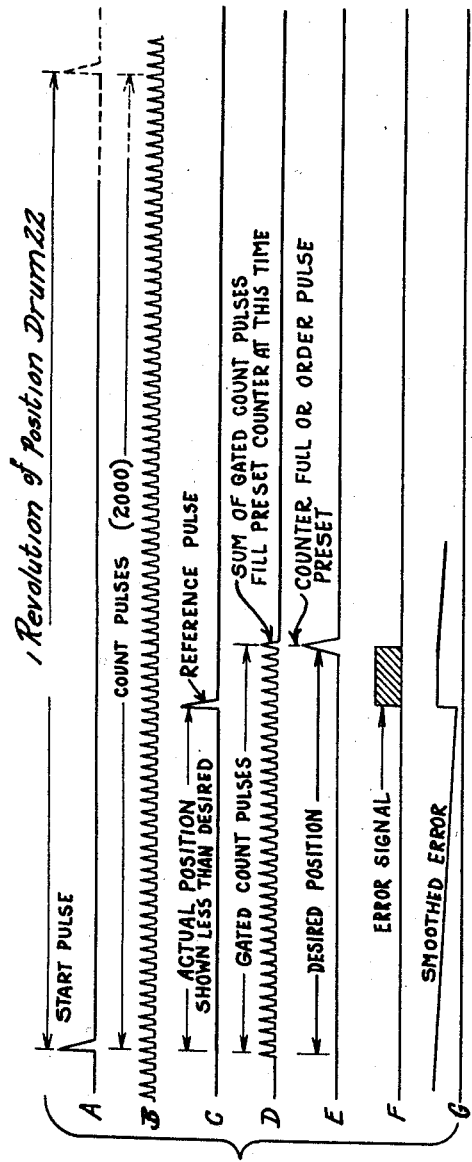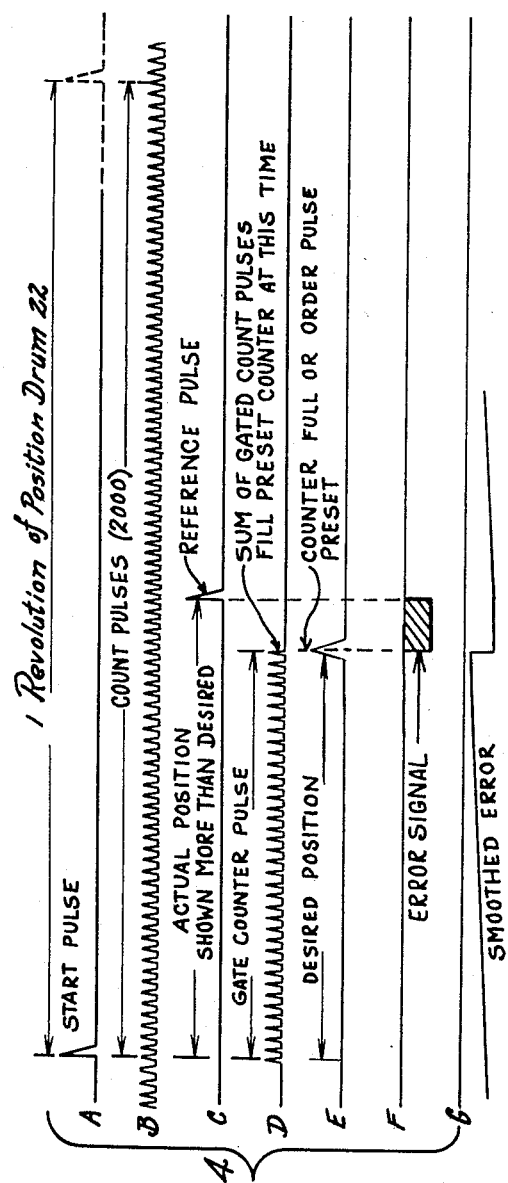

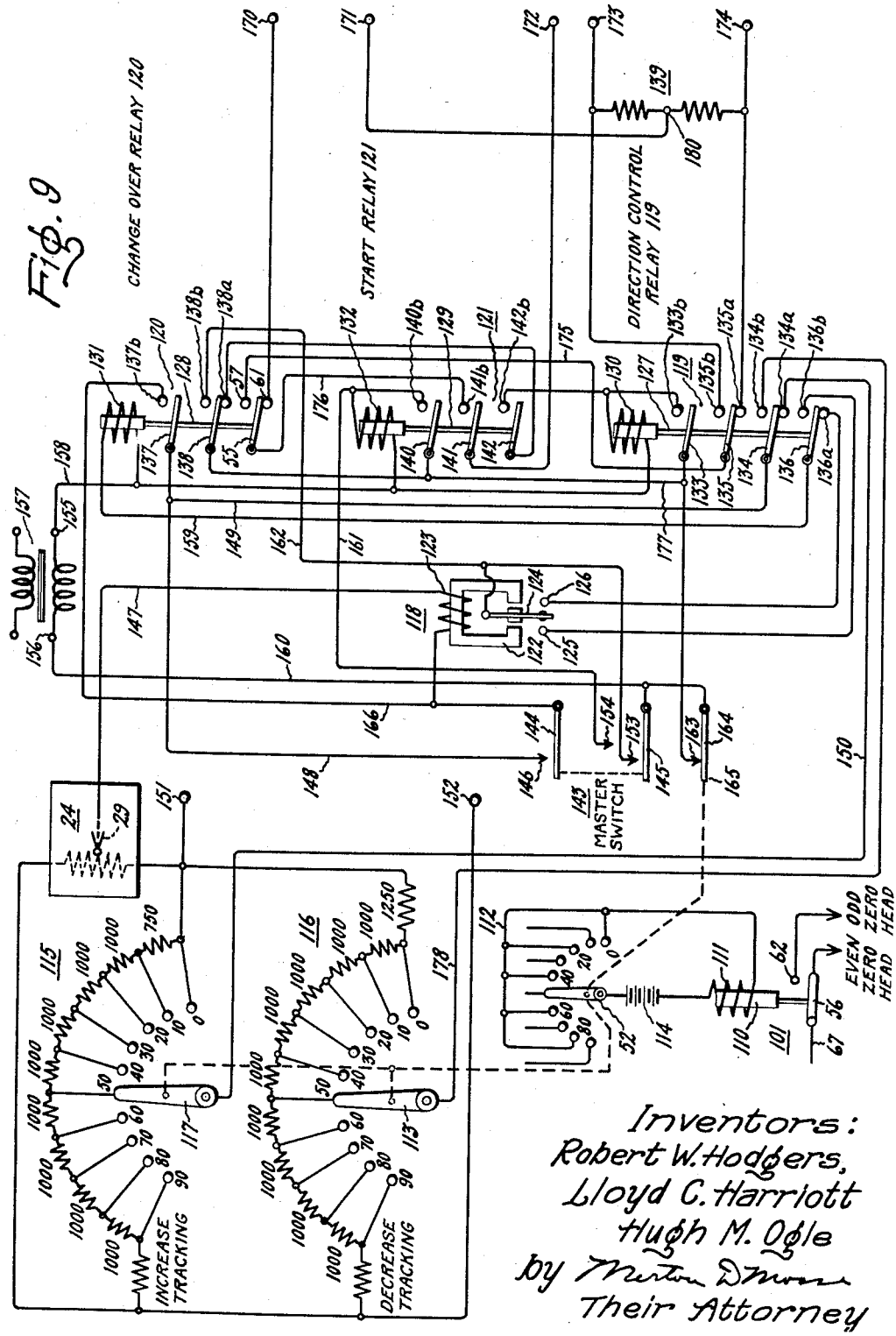

2,907,938

POSITION CONTROL SYSTEM

Robert W. Hodgers, Media, Pa., Lloyd C. Harriott, Schenectady, N.Y., and Hugh M. Ogle, Palo Alto, Calif., assignors to General Electric Company, a corporation of New York Application April 11, 1957, Serial No. 652,165

10 Claims. (Cl. 318—29)

This invention relates to an automatic control system and apparatus for automatically controlling the precise position of an object, such as the working member of a machine tool, in accordance with a predetermined or pre-selected program. More particularly, the control system may be said to be a numerical position control since it controls the position of the desired object in accordance with a preset numerical program.

With the present industrial accent on automation, systems which can be utilized to control machine tools automatically in accordance with a preset or predetermined program are in great demand. The present system is applicable to the automatic control of precise positions of machine tools such as step turning lathes, lamination shears, rolling mill screwdowns, Weideman presses, component placement machine, etc. The system may be used for one or two axes of control but if two axes of control are used the one axis control system described and illustrated herein must be duplicated. The particular system employed is adaptable to control the position of an object in accordance with a program set-up on conventional programming devices such as punched cards and magnetic tapes and the technique for ascertaining the position of a particular tool or carriage being controlled may involve the use of such sensing elements as photoelectric cells, magnetic pickups, and resistive or capacitive pickup and selection techniques. However, the particular system as illustrated utilizes a magnetic sensor in connection with the digital position control and resistance means for the coarse analog position sensor.

The particular control system has the advantages of being highly accurate, controlling at high speed, and presenting a negligible reaction on the member being positioned. In addition, the present system has the advantage of being capable of digital operation without the necessity of utilizing conventional binary codes and subsequently converting them to an analog signal.

It is an object of this invention to provide an accurate position control system which automatically controls the position of a device or apparatus in accordance with a preset or preplanned program.

Another object of this invention is to provide an automatic position control system which will automatically position an object in accordance with a preplanned program and performs this function in a digital manner.

Still another object of this invention is to provide such apparatus which utilizes both analog and digital techniques to obtain an extended range for positioning particular apparatus under consideration.

Briefly stated in accordance with this invention, an automatic position control system is provided which determines the position of an object such as a machine tool carriage in accordance with a preplanned or preselected program by providing a highly accurate digital position sensing device for indicating the position of the object to be controlled and further providing a means for comparing this position with a preplanned or preprogrammed position. The system further produces an electrical signal which is indicative of the difference between the preset position of a controlled object and its actual position and utilizes this electrical signal to change the position of the object until it corresponds precisely to the position ordered by the programmer.

The invention also contemplates the use of a coarse position control to position the object to a point within a certain range of the selected position whereupon the system changes over from the coarse position control to the fine control just described.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1 is a diagrammatic view in partial perspective illustrating the elements of the control system utilized in conjunction with the carriage of a lathe;

Figure 2 is a diagrammatic representation of a comparator circuit which may be utilized in the system illustrated in Fig. 1;

Figures 3 and 4 illustrate voltage waveforms developed and utilized by various components of the system of Figure 1 which waveforms are utilized in describing two operating conditions of the system illustrated in Figure 1;

Figures 5, 6, and 7 represent waveforms of the output voltage from the multivibrators illustrated in the comparator circuit of Fig. 2 for three different circuit operating conditions which waveforms are utilized in explaining the operation of the comparator circuit;

Figure 8 is a schematic illustration which illustrates the mode of operation of the position control system when using both a coarse analog position control and a fine digital position control; and Figure 9 is a schematic circuit diagram of the coarse analog position control system and the means used to change from the analog to the digital system.

The invention may best be understood by referring specifically to Figure 1 of the drawing which illustrates the control system utilized to control the position of a tool carriage 11 of lathe 10. The tool carriage 11 may be moved longitudinally along the lathe bed 12 in either direction by means of a conventional tool carriage lead screw 13. In order to provide for automatic movement of the lathe carriage 11 along the lathe bed 12, one end portion of the lead screw 13 is provided with a driven gear 14 which is meshed with a driving gear 15 connected to the shaft 16 of a reversible drive motor 17. When reversible motor 17 is driven in a clock-wise direction as illustrated by the arrow on the end of driven gear 15, the lead screw 13 is rotated in such a manner that the lathe tool carriage 11 is moved to the left toward the motor (decrease tracking) and conversely if the motor 17 is rotated in a counter-clockwise direction, the lathe tool carriage 11 is driven longitudinally along the lathe bed to the right (increase tracking). For the particular application, it was desired to provide a highly accurate position control for a carriage travel over a 200 inch travel interval.

In order to provide an accurate indication of the position of the tool carriage with respect to the lathe bed, for example to provide an accurate indication of the tool carriage position mark 18 with respect to calibrated scale 20 on the lathe bed 12, a position scanner 21 is provided. The position scanner illustrated includes a position indicating drum 22 with a steel wire 23 wrapped around the circumference of the drum and connected to an ear 9 on the lathe tool carriage 11 whereby the rotational position of the drum 22 is determined by the actual position of the lathe tool carriage 11. In other words, the use of the coupling wire 23 around the position drum 22 converts the linear position of the lathe tool carriage 11 into a rotary position of position drum 22. In addition, a multiturn helical potentiometer 24 has its rotating contact connected by means of a shaft 25 to the position drum 22 so that the position of the lathe tool carriage 11 with respect to the lathe bed 12 also determines the exact position of the rotary contact of the potentiometer 24.

As a matter of convenience, the outer circumference of the position drum 22 was selected as 20 inches. Thus a movement of the tool carriage 11 from one end of the lathe bed 12 to the other (a full 200 inch travel) results in an even 10 full rotations of position drum 22. Since the position drum may be rotated ten full turns, it should be apparent that the potentiometer 24 must also be provided with ten full turns.

For the particular application a special potentiometer which is of a more or less helical configuration and which has more than a single turn was used. The potentiometer 24 is provided with a contact, not shown in Fig. 1, which contact tracks the potentiometer over the full 10 helical turns. Such a potentiometer is available commercially under the name Helipot.

The potentiometer 24 is utilized as a coarse analog position sensor. This coarse position sensor, as will be more fully explained subsequently, is utilized to provide an electrical signal, which signal is indicative of the general position range of the lathe tool carriage 11 whereas the position scanner 21 is utilized to indicate the precise digital position of the carriage.

In order to understand the control loop which provides the coarse position control for the tool carriage 11, this portion of the control loop is described here first in connection with the block diagram of Figure 1 and the schematic representation of the equipment shown in this figure. The fine or vernier digital control is next described in connection with this figure, leaving out specific details of how the change-over from the coarse positioning to the fine positioning is accomplished and also leaving out some of the exact details as to how the fine positioning is carried out in order to make the description more understandable. Later in the description the details of a particular embodiment of the present invention are given in order to afford a complete understanding.

The control loop for coarse positioning includes the tool carriage 11 itself, the position scanner 21 (the helical potentiometer 24 on the scanner), coarse analog control 53, amplifier 60 and reversible drive motor 17 which positions the carriage 11 by means of the lead screw 13. Amplifier 60 and reversible drive motor 17 are also used in the fine or vernier control loop as is subsequently explained. To preset the coarse position of the lathe tool carriage 11, a coarse order block selector or dial 52 which is calibrated in tens of inches; i.e., 0, 10, 20, 30, 40, etc. (not shown in detail in Fig. 1) is utilized to select the general range of operation. The order block selector 52 is set for the tens of inches required; for example, 10, and in so doing a voltage which corresponds to the order 10 is selected and set up in a circuit of coarse analog control 53.

As was previously indicated the tap of helical potentiometer 24 is positioned in accordance with the exact position of the lathe tool carriage 11 and therefore provides a voltage which corresponds to this position. A lead 54 from potentiometer 24 to coarse analog control 53 represents an electrical connection between the tap of potentiometer 24 and the coarse analog control 53. The tapped voltage from the potentiometer 24 is thus compared with the voltage set on the coarse analog control 53 by the order block selector 52. Any difference in potential between these two voltages results in an output voltage from coarse analog control 53, the polarity of which depends upon the relationship of the actual carriage position to the selected position.

In order for the coarse analog control 53 to be operative to drive the reversible carriage positioning motor 17, a control select switch 55 is placed in contact with its lower terminal 57 to connect the output of the coarse analog control 53 to supply the amplifier 60. Reversible motor 17 is connected to be responsive to the output voltage supplied by amplifier 60 to move the carriage 11 toward the selected position. For the present discussion, the means utilized to control the position of switch 55 need not be considered. However, this is considered in detail in connection with the discussion of the coarse analog control circuitry illustrated in Figure 9.

The particular amplifier 60 which is used in the present apparatus is a conventional rotating type of amplifier known in the art as an amplidyne amplifier. The type of amplifier used is not important to the present invention, therefore its operation is not discussed here. However, it should be sufficient to say that this amplifier 60 amplifies the difference voltage supplied to it and applies a voltage to energize the reversible motor 17 in such a manner that it drives the tool carriage 11 along the lathe bed toward the 10 inch position as set up by the order block selector 52. As the tool carriage 11 moves in the proper direction it drives the position drum 22 through the steel wire 23 and hence the tap on the multiturn potentiometer 24 in a direction to make the voltage at the tap on potentiometer 24 correspond to that voltage set on the coarse analog control 53 by the order block selector 52. When the error voltage between these two devices is reduced to substantially zero, the switch 55 is automatically moved to its upper terminal 61 to change the system over to operate on the fine or vernier position control.

The fine or vernier, digital servo control loop illustrated includes the lathe carriage 11, position scanner 21, preset counter 63, comparator 71, the amplifier 60, and the reversible drive motor 17 with its drive connection to the tool carriage 11. Note that amplifier 60, drive motor 17, and the lathe carriage 11 are common to both control systems and the electrical components (the amplifier 60 and motor 17) are changed from one control loop to the other by means of the control select switch 55.

In order to aid in understanding the digital control system, the function of its various components is described first and then the details of these components are discussed to show how they each perform the individual functions.

Briefly stated, the fine or vernier control system operates in the following manner. The precise tool carriage position desired is preset on preset counter 63 which is capable of producing a digital output voltage and which corresponds in time to the precise position selected. Position scanner 21 produces a digital output voltage wave indicative of the actual position of the tool carriage 11, comparator 71 compares the digital information from the preset counter 63 with that from position scanner 21 and produces an output voltage which is a function of the error between the information thus supplied (a function of the displacement of the tool carriage 11 from the desired position). This voltage is then applied to the amplifier 60 to cause drive motor 17 to drive the tool carriage 11 toward the preselected position. The moving tool carriage 11 rotates the position drum 22 of the position scanner 21 in a direction to eliminate the digital error between the position information derived therefrom and that which is supplied by the preset counter 63. Motor 17 continues to drive carriage 11 until the position error is eliminated.

In order to understand how the position scanner produces digital information indicative of the actual position of the tool carriage 11, reference should be made to the structure illustrated in Fig. 1. As was previously indicated, the rotational position of position drum 22 is determined by the position of tool carriage 11. The position drum 22 is provided around its inner circumference with 2,000 magnetic teeth 26, and 1 zero tooth 27. These magnetic teeth are utilized in connection with a reference tooth 28 which is fixed in space and four rotating magnetic pickup heads 30, 31, 32 and 34. Each of these magnetic puckup heads produce an electrical pulse each time it passes over a magnetic tooth. Count pickup head 30, "odd" zero pickup head 31 and reference pickup head 34 are fixed to one end of a positioning arm 35 and "even" zero pickup head 32 is fixed to the opposite end of this arm. These pickup heads are positioned on the arm 35 in such a manner that when the arm is rotated about its center, count pickup head 30 passes over the count teeth 26, the two zero count pickup heads 31 and 32 pass over the zero tooth 27, and the reference pickup head 34 passes over the fixed reference tooth 28. The arm 35 is fixed at its center to a shaft 36.

Rotation of the arm 35 is produced by a motor 38 which is provided with a pulley 40 on the end of its shaft and a belt 41 which couples the motor driven pulley 40 to a pulley 37 on the pickup head drive shaft 36. The actual speed at which the shaft 36 is driven is not important but it is preferred that the speed be relatively constant. A shaft speed of about 1200 r.p.m. was found to be acceptable. Electrical connections (not shown) are brought out from the various magnetic pickup heads to sliprings on the motor driven shaft. For example, electrical connections from the count magnetic pickup head 30 are brought out to the slipring 42, connections from the zero pickup head 31 are brought out to the slipring 43, electrical connections from the zero pickup head 32 are brought out to the slipring 44, and electrical connections from the reference pickup head 34 are brought out to the slipring 45. Each of these sliprings are electrically insulated from each other and they are provided with brushes 46, 47, 48 and 50 respectively. For convenience, the electrical connections that are brought out from these brushes are given the same numbers as the brushes.

On each revolution of the pickup head supporting arm 35, count pickup head 30 produces 2000 count voltage pulses, zero pickup heads 31 and 32 each produce one zero or start voltage pulse, and the reference pickup head 34 produces one voltage pulse. The second zero magnetic pickup head 32 is not utilized with single turn operation of the position drum 22 but is provided for use with a multiturn operation of the apparatus as is described subsequently. The type of voltage waves produced by the pickup heads are illustrated in Figs. 3 and 4. Curve A of both figures illustrates a zero or start voltage wave as produced by zero pickup heads 31 and 32. Curve B illustrate count pulses as produced by count pickup head 30, and curves C illustrate a reference voltage wave as produced by pickup head 34.

The preset counter 63 may be any one of the many conventional types commercially available such as the Berkley Preset Counter, Model No. 5426. Such a preset counter upon being set to give a certain number of counts will, upon receiving an initiating electrical pulse, count the preset number of pulses and stop, whereupon it produces an output pulse which may be termed an "order pulse." When the counter produces the order pulse, it also resets itself to start counting again upon receiving another initiating pulse. With the functions performed by the preset counter 63 and the position scanner 21 in mind, the cooperation of these two devices may be seen by reference to Fig. 1. As previously indicated, the brush 46, which is positioned on the slipring 42 of the position scanner 21 receives the count pulses (2,000 per revolution) produced by the count pickup head 30. At the same time the brush 47 receives the zero or start pulses from odd zero magnetic pickup head 31. If the switch 56 is in its upper position and closed on its upper terminal 62, a zero pulse at brush 47 is transmitted through the switch 56 and lead 67 to the counter gate 68 of preset counter 63. A gate circuit is a well known electronic circuit which, in the present instance, simply performs the function of passing or not passing a voltage applied to its input circuit. The zero pulse acts as an enabling pulse to open the counter gate 68 and provide a current path from the count pulse pickup head 30 to the preset counter 63.

The counter gate forms a part of the Berkley preset counter previously referred to; therefore, the circuit is not shown or described in detail. However, a gate circuit which is satisfactory for this application is shown on page 366 of volume 19 of the Massachusetts Institute of Technology Radiation Laboratory Series book entitled Waveforms published by McGraw-Hill Book Company, 1949 in Figure 10.1.

Once the counter gate 68 is opened by the zero pulse, the count pulses (the count pulses produced by the count magnetic pickup head 30) are conducted from the brush 46 through the counter gate 68, whereupon the preset counter 63 counts the number of pulses which is preset on the counter. Upon the reception of the preset number of pulses, the counter automatically delivers an "order pulse." This pulse at the counter which is produced at output lead 70 is applied to the counter gate 68 to close this counter gate and reset the preset counter. The time of this order pulse in the scanning cycle corresponds to the time of occurrence of the count pulse which would be aligned with the reference tooth 28 if the tool carriage 11 were in the preset position. The relative time of occurrence of the order pulse and the reference pulse from the reference magnetic pickup head 34 (supplied through the slipring 45, brush 50 to the comparator 71) is then compared by the comparator 71. The comparator circuit 71 then produces an output voltage which is a function of the difference between the actual position of lathe carriage 11 and that which was preset on the preset counter 63 and which has a polarity determined by the direction of displacement of the lathe carriage from the preset position.

This action may best be understood by referring to the schematic diagram of Fig. 1 and the voltage wave shapes illustrated in Figs. 3 and 4. As was previously indicated, the position scanner 21 has a position drum 22 the rotational position of which corresponds to the actual physical position of the lathe carriage 11. As the count magnetic pickup head 30 produces the 2,000 count pulses for each revolution of the motor driven shaft 36 illustrated by curve B of Figs. 3 and 4, at the same time odd zero mark pickup head 31 produces an electrical pulse as illustrated by curve A of these figures each time it passes over the zero tooth 27. In order to determine the rotary displacement of the position drum in space, it is necessary to have some reference point. Therefore, the reference tooth 28 and its associated reference magnetic pickup head 34 are utilized to produce a voltage pulse (curves E of Figs. 3 and 4) for each revolution of the motor driven shaft 36 which pulse occurs at a given time regardless of the position of lathe tool carriage 11. With this arrangement each of the 2,000 teeth which produce the count pulses can be given a number starting with the count pulse which is coincident with the zero tooth 27 and numbering subsequent teeth from 1 to 2,000. In a like manner, the count pulses can be numbered to correspond to the teeth which produced them. Thus, the 2,000 pulses so produced may be considered a time scale. If the time of the reference pulse and the zero or start pulse coincide, then it may be said that the position drum is in its zero position. The actual physical position of the position drum 22, then, can be determined by the number of count pulses which occur between the start or zero pulse and the reference pulse. For example, if the zero pulse occurs and 450 count pulses occur before the reference pulse is produced, then it may be said that the position drum 22 is in position 450. Obviously, this position can be related to and calibrated in inches, meters or any other desired measurement.

This information is, of course, necessary to the operation of the equipment but in addition to this information it is necessary to produce an electrical signal which is a function of the difference between the actual position of the carriage 11 and the desired position; i.e., the difference between the number of count pulses which occur in the interval between the zero and reference pulses, if the system is to be rendered automatic. As previously indicated, this actual voltage is produced by the comparator circuit 71. In general, this is accomplished by setting the preset counter 63 to count the number of pulses which correspond to the desired tool carriage position. Thus, as indicated previously, a zero or start pulse is applied to the counter gate 68, and the preset counter 63 starts counting the count pulses which pass through the gate (curves B of Figs. 3 and 4) and continues to count until it counts the preselected number of pulses. It then delivers an order or counter full pulse (curves E of Figs. 3 and 4) which order pulse closes counter gate 68, resets the preset counter and is also applied to the comparator circuit 71. In the meantime, the reference pulse (see curves C) has been delivered to the comparator circuit and the comparator circuit delivers an output voltage (error signal) which is of predetermined magnitude and the duration of which is determined by the time which elapses between the occurrence of the reference pulse and the order pulse.

The error signal produced by the comparator 71 is illustrated by curves F of Figs. 3 and 4. It is noted that this error signal illustrated in Fig. 3 is a positive voltage and the error signal illustrated in Fig. 4 is a negative voltage. The difference is the direction of displacement of tool carriage from the selected position. In the condition illustrated in Fig. 3, the reference pulse occurs before the order pulse and therefore the lathe carriage 11 must be driven in the increase tracking direction in order to make the reference pulse position correspond to that of the order pulse and thereby position the lathe carriage in accordance with the position set on the preset counter. For the condition illustrated in Fig. 4 the lathe carriage 11 was positioned in the opposite direction from the desired position when this position was set up on the preset counter and, therefore, it was necessary to drive the reversible motor 17 in the opposite direction to return the lathe carriage 11 to the preset position.

The smoothed error voltages which are illustrated by curves G of the two figures are of the same polarity as the error signal in every case and the average magnitude of these error signals is a function of the time duration of the error signal. This smoothed error signal is produced by a relatively conventional smoothing circuit described later in the specification in order to produce a motor driving voltage which occurs substantially over the full period of time that an error exists rather than providing a series of short pulses each followed by a relatively long period in which there is no voltage applied to the motor.

A comparator circuit which will produce the error voltage indicated by curve E of Figs. 3 and 4 is illustrated in block form in Fig. 2 and the wave shapes for the various components utilized in the comparator circuit are illustrated in Figs. 5, 6 and 7.

Referring specifically to Fig. 2, it is seen that the comparator 71 consists of two conventional bistable multivibrators 81 and 83, two logical circuits known as "and" circuits 84 and 85, an inverting circuit 86 and a conventional summing amplifier 87. The multivibrators 81 and 83 may be any one of a number of conventional bistable types. For example, each of the multivibrators may be of the type illustrated in Fig. 5.4 on page 164 of the Massachuseets Institute of Technology Radiation Series, vol. 19, entitled Waveforms, published by McGraw-Hill Book Company, 1949. The two characteristics of the bistable multi-vibrator which are important to the present circuit are that it is stable for either one of two states of operation and two output voltages can be obtained from the circuit for each state. Such multivibrators are changed from one stable state to the other by applying an input or triggering pulse.

The logical circuits known as "and" circuits 84 and 85 may be of any conventional type, such as the dual grid gate circuit illustrated in Fig. 4–1a on page 37 of the book by the Engineering Research Associates entitled Highspeed Computing Devices, published by McGraw-Hill Book Company, 1950. Such a circuit is termed an "and" circuit for the reason that it produces an output voltage only when a positive potential is applied to both of its input circuits. For example, the "and" circuit 84 produces a constant amplitude voltage between its output terminal 88 and ground potential when a positive potential is applied to each of its input terminals 90 and 91. If a positive potential is applied to either one of its input terminals alone the "and" circuit does not produce an output voltage and if there is no voltage applied to either input terminal the "and" circuit does not produce an output potential.

The summing circuit 87 may also be of any conventional type such as the circuit illustrated in Fig. 1.7d on page 11 of the book by Korn and Korn, entitled, Electronic Analog Computers, published by McGraw-Hill Company, 1952. The inversion circuit 86 is simply a circuit which produces a voltage of the opposite polarity to that which is applied to the input terminal 95. For example, the circuit may be of the type illustrated in Fig. 92 on page 115 of the book entitled Industrial Electronic Control by N. D. Cockrell, published by McGraw-Hill Book Company, 1944. Since the actual circuitry is in each case conventional, it is felt that a description of the specific circuits would only serve to confuse the description of an already complex apparatus.

An understanding of the operation of the comparator 71 may best be had by specific reference to the voltage waveforms of Fig. 5. In this figure, waveforms $a$ and $b$ represent the two output voltage waves which are produced at output terminals 79 and 80, respectively, of the order multivibrator 81 and waveforms $c$ and $d$ represent the voltage waveforms produced at the output terminals 82 and 89, respectively, of reference signal multivibrator 83. The vertical line marked "zero pulse" indicates the change of state of the multivibrators which occurs when a zero or start pulse is applied. For convenience the output of a given multivibrator terminal is said to be either (0) or (1). Since two output voltages are taken from each multivibrator, one output is (0) and the other is (1). If a pulse is applied to the input of a multivibrator to change its state of operation, the output terminal which was formerly "zero" becomes "one" and vice versa.

The voltage waves of Fig. 5 illustrate the condition when the position of the tool carriage 11 is in correspondence with that selected by the preset counter 63. This condition is indicated by the coincidence of the reference pulse from reference pickup head 34 and the order pulse presented by the preset counter 63. The operation of the comparator circuit 71 for this condition is as follows: a zero pulse from position scanner 21 is applied to both the order and reference multivibrators 81 and 83 at the same time; thus output from terminal 79 of the order multivibrator 81 is changed from (0) to (1) as indicated by curve $a$ of Fig. 5, while the output from terminal 80 of this multivibrator is changed to the opposite condition; i.e. from (1) to (0) as illustrated by curve $b$. The voltage waves of $c$ and $d$ illustrate that the output voltages from terminals 82 and 89, respectively, of the reference signal multivibrator 83 are changed in a similar manner. Upon the occurrence of the coincident order and reference pulses, the output voltages which appear at the output terminals 79, 80, 82 and 89 return to the original values.

From an inspection of the output voltage waveforms $a$, $b$, $c$, and $d$ in Fig. 5, it is seen that neither of the "and" circuits 84 or 85 produce an output voltage for the conditions just described. For example, Fig. 5 shows that immediately after the occurrence of a zero pulse the voltage at terminal 90 of "and" circuit 84 is (1) while the voltage or potential at terminal 91 is (0). In like manner, the voltage at the input terminal 92 of "and" circuit 85 is (1) while the voltage at the input terminal 93 is (0). Immediately following the occurrence of the coincident order and reference pulses, the input terminal 90 of "and" circuit 84 is (0) while the input terminal 91 is (1) and the input terminal 92 of "and" circuit 85 is (0) while input terminal 93 is (1). As long as the tool carriage position coincides with the preset position this condition remains and neither of the "and" circuits produces an output voltage.

For the situation illustrated in Fig. 3 where a reference pulse occurs before the counter full or order pulse from the preset counter 63, the "and" circuit 84 produces a positive output voltage pulse. This condition is illustrated in Fig. 6. As described with respect to Fig. 6, the occurrence of a zero or start pulse (produced by position scanner 21) changes the condition of both multivibrators 81 and 83 but does not cause either of the "and" circuits 84 or 85 to produce an output voltage. However, since a reference pulse (from position scanner 22) occurs before an order pulse (from preset counter 63) the state of the reference signal multivibrator 83 is changed in such a manner that the output potential at terminal 82 is switched from (1) to (0) and the potential at output terminal 89 is switched from (0) to (1) while the state of order signal multivibrator 81 remains the same. Thus, the input terminal 90 of "and" circuit 84 receives a (1) while the input terminal 90 remains at (1), therefore, "and" circuit 84 starts to produce an output voltage at its output terminal 88 while "and" circuit 85 remains inactive. Upon the occurrence of an order pulse the order multivibrator 81 is switched to its initial state and therefore the potential at input terminal 90 of "and" circuit 84 is switched to (0) while the potential at terminal 91 remains (1), and the output voltage from the "and" circuit 84 returns to zero while the output of "and" circuit 85 still remains at zero. Under these circumstances, for the period between the occurrence of the reference pulse and the order or counter full pulse, the positive potential which is developed at output terminal 88 of "and" circuit 84 is applied to the input terminal 73 summing amplifier 87 which in turn amplifies this voltage. Input terminal 75 of smoothing circuit 72 is connected to output terminal 74 of summing amplifier 87. Therefore, smoothing circuit 72 receives the voltage produced by summing amplifier 87 and produces the smoothed error signal as illustrated by the curve G of Fig. 3 at its output terminal 76. This error potential is of a polarity to drive the carriage drive motor 17 in a direction to move lathe carriage 11 to the preselected position. An error signal continues to appear for each revolution of the magnetic pickup heads until the carriage 11 is moved to the precise position selected by the preset counter 63 whereupon the condition illustrated by the voltage waves of Fig. 5 obtains.

The smoothing circuit 72 may be of any conventional type that produces an output voltage which has an average value that is a function of the time duration of the applied constant amplitude voltage. In other words, the smoothing circuit is, in effect, an integrating circuit. Such a circuit is illustrated in Fig. 4.7 on page 125 of the book entitled Electronic Analog Computers by Korn and Korn, published by McGraw-Hill Book Company, 1952.

The wave shapes of Fig. 7 illustrate the operation of the comparator multivibrators 81 and 83 when the carriage 11 on the lathe must be moved in a direction which is opposite to that described above to reach the preset position. Under these circumstances, the preset counter 63 delivers an order or counter full pulse prior to the occurrence of the reference pulse as is illustrated by the voltage curves of Fig. 4. Once again, on the occurrence of a zero pulse the "and" circuits 84 and 85 do not produce an output voltage. However, upon the occurrence of an order pulse, as indicated by the vertical line marked "order pulse" in Fig. 7, order multivibrator 81 is switched back to its original state. Reference multivibrator 83, of course, is not affected by the order pulse. Therefore, "and" circuit 85 produces a voltage at its output terminal 94 since both of its input terminals 92 and 93 receive a potential (1). At the same time, the input terminal 90 of "and" circuit 84 is at (0) potential and in a like manner, input terminal 91 of this circuit is at (0) potential. Consequently, "and" circuit 84 does not produce an output voltage. When a reference pulse is delivered, the reference multivibrator 83 is switched to its original state and cuts off the output voltage of "and" circuit 85. The voltage produced by "and" circuit 85 is of a fixed amplitude and has a duration proportional to the displacement of the carriage 11 from the desired position. Output terminal 91 of "and" circuit 85 is connected to input terminal 95 of inverter circuit 86 which provides a voltage at its output terminal 96 which is inverted (see Fig. 5f). Input terminal 97 of summing amplifier 87 is connected to inverter output terminal 96 to receive the inverted voltage. The polarity of the voltage wave thus applied to summing amplifier 87 is such as to return the carriage 11 to the position selected by preset counter 63. This voltage is also smoothed by smoothing circuit 72 to produce the waveform G of Fig. 4 which has an average value that is a function of the duration of the voltage applied.

The above description shows the operation of the rough or coarse position control as one control and the fine or digital control as a separate control. However, it should be noted that the digital control alone operates properly over only one full turn of the position drum 22. To obtain accurate position control over a distance which is greater than the 20 inch circumference of position drum 22, the coarse and fine control systems must be combined. Combining the two control systems, however, presents some special problems. For example, if the coarse position control is to be utilized to set the order of operation, for example between 10, 20, 30, 40, and 50 inches, etc., and the digital control is to take over and position the carriage at any point between these positions without ever reversing the direction of travel, then the coarse position control would have to set the carriage precisely at the mark selected. If the coarse analog position control were accurate enough to position the tool carriage 11 at a precise position, there would be no need to utilize a digital vernier control. The particular control described herein has an accuracy of better than 2 mills in 20 inches and if desired, better accuracy could be obtained. To obtain such accuracy, it is necessary to use the coarse position control to position the carriage in an approximate manner and utilize the fine digital control for the precise positioning. This must be accomplished without overshooting the selected position.

For the above reasons, it is necessary to add a special circuitry to the coarse and fine controls described above if they are to be used together. For example, the position scanner 21 is provided with a second magnetic pickup head 32 called the "even" zero magnetic pickup head so that by switching from one zero magnetic pickup head to the other which is positioned on the opposite end of arm 35, it can be made to appear as if the zero position is displaced 1,000 (of the 2,000) counts from the count and reference magnetic pickup heads 30 and 34. The reason for this arrangement is explained more fully hereinafter. By utilizing both of the zero pickup heads; i.e., the "even" zero head 31 and the "odd" zero magnetic pickup head 32, 1,000 teeth on either half of the position drum 22 may be counted at any one particular time. This becomes important when moving the carriage 11 in opposite directions along the lathe bed 13.

A coarse control order switch 52 referred to in the discussion of Fig. 1 is illustrated in more detail in Fig. 9. This switch is used to select the desired order and the preset counter 63 is utilized to select the desired carriage position within the order range. For example, if the lathe tool carriage 11 is to be positioned at 15 inches on the lathe bed, the coarse control order switch 52 is moved to position "10" to give the order 10 and the position "5" would be set on the preset counter 63 so that the total of the sum of the two settings equal the desired 15 inches.

For purposes of description, each 10 inch interval along the lathe bed starting with zero is termed an "order range." For example, the 10 inch interval from zero to 10 inches is termed the "zero order range" and the 10 inch interval from 10 inches to 20 inches is called the "ten order range."

As indicated above, the coarse analog control cannot be made accurate enough to position the carriage 11 of the lathe as desired. As a consequence, it also follows that the coarse position control cannot be relied upon to set the tool carriage 11 at the beginning of any exact order range desired. For example, if the order selector switch 52 is set for 20, the coarse position control is not accurate enough to set the carriage precisely at 20 inches.

In order to insure against the possibility that the coarse control will allow the tool carriage to pass the selected position, some means must be provided to make sure that the system changes over from the coarse analog control to the digital control before the carriage reaches the selected position. However, this presents another problem in that the position drum 22 cannot sense the selected order. Assume, for example, if 22.5 inches is preset as the desired position for the tool carriage 11, the order 20 is set on the coarse selector dial 52 and 2.5 inches is set on the preset counter. If the fine control is placed in operation before 20 inches (the order 20) has been reached, the carriage 11 will still be between the order 10 and the order 20 (in order range 10). Therefore, the digital control is directed to position the carriage at 2.5 inches within the 10 order range. Accordingly, the fine control positions the carriage 11 at 12.5 inches on the lathe bed instead of at the desired 22.5 inches.

In order to avoid this problem, the comparator circuit is restricted to operation in a half turn of the position drum 22 at a time. The 200 inch portion of lathe bed 13 which is being used is effectively divided into 20 ten inch intervals. Each of these 20 inch intervals (termed order blocks) is selected by one position of the position of order selector 52. Each order block is overlapped by the subsequent block by 10 inches and each block is provided with 5 inch change-over bands at each end. The center 10 inches of each order block is the 10 inches which encompasses the digital orders which may be selected in the order block (i.e. the 10 inch order range). In order to provide the 5 inch change-over band, the position drum 22 is displaced one quarter of a turn ahead of the reference positon so that the preset counter 63 is required to count 500 more than the selected number. This may be seen by inspection of Fig. 8. In this figure, each complete order block is selected by one position of the order selector switch 100. The clear block which occupies the center 10 inches of each order block represents the order range wherein digital orders may be placed for the particular order block under consideration. The shaded blocks are regions wherein the change over from coarse to fine control takes place. The arrows point to nominal change-over positions in the change-over bands and the direction of the arrows indicate the direction of the constant speed drive for a particular change-over point.

The zero order block, i.e. the block which contains all digital orders between zero and 10 inches starts at zero since the resistance of the potentiometer 24 of the coarse position control can be made zero for this position. It is noted that the phantomed block to the left of the zero order block is displaced one quarter turn or the equivalent of 5 inches (500 counts) to the left of the actual zero. Thus if any digital order between zero and 10 is given by the preset counter 63, the zero tooth opens the gate to the preset counter as previously described (at the point marked at the extreme left of the zero order) the counter counts up to 500 and then as many more counts as is necessary to present an order pulse which corresponds to the desired position.

Assume that the digital order 2 is given and the coarse analog order selector switch 52 is set to select the second order block; i.e., the 10 order block so that 12 inches is the position ordered. If the carriage 11 is at the zero positon, the system operates as follows: The coarse analog control 53 supplies the drive motor 17 with a potential to drive the tool carriage 11 along the lathe bed 13 to the right and the "even" zero pickup head 32 is connected to open counter gate 68 of preset counter 63 by zero select switch 56. When the carriage 11 moves to the right 5 inches, the "even" zero pickup head 32 passes the zero tooth and sends a gating pulse to the counter gate 68 and the preset counter starts counting. Somewhere near the 7.5 inch mark (designated as a nominal change over position for the second order block) switch 55 is changed over to connect the output of the comparator circuit 71 to amplifier 60. Preset counter 63 is constantly sensing the difference between the selected digital order and the tool carriage position and comparator 71 is producing an output voltage which is a function of the position error. When the change over between systems occurs, this voltage from comparator 71 is applied to drive motor 17 through amplifier 60 to drive the carriage 11 on toward the 2 inch mark in the second order (12 inches).

This sequence is the same for all increased tracking and it is noted that the nominal change over position for each order block is approximately 2.5 inches before the beginning of the order. Each succeeding order block utilizes the opposite zero magnetic pickup head. The manner in which this is accomplished is explained in more detail subsequently. Note, however, that the 0, 20, 40, 60 and 80, etc. order blocks use the odd zero magnetic pickup head 31 while the 10, 30, 50, 70, etc. order blocks utilize the even zero magnetic pickup head 32.

The coarse analog position control with the change-over switches necessary to change the input to the reversible drive motor 17 from the coarse analog position control to the fine digital position control is illustrated in Fig. 9. Fig. 9 also shows simplified circuitry which illustrates one method by which the output of the "odd" zero magnetic pickup head 31 and the even magnetic pickup head 32 may be alternately selected for use with the counter gate 68 of the preset counter 63.

As illustrated, the selection of the proper zero head is accomplished by utilizing a switch 101 which is provided with a magnetic armature 110 surrounded by an actuating solenoid 111. The energizing circuit of the coil 111 is closed by placing the position selector on any of the interconnected contacts for the orders 0, 20, 40, 60, 80, etc. This circuit may be traced from the particular position terminal selected through selector switch 52, a source of energizing potential such as battery 114, the switch coil 111, and conductor 112. Thus, when the order block selector switch 52 is in contact with any one of the 0, 20, 40, 60, 80, etc. terminals, the armature 110 is picked up to position the switch member 56 in contact with the upper terminal 62 and thereby supply the output of the "odd" zero magnetic pickup head 31 to the counter gate 68. When the selector switch 52 is in contact with any of the terminals to give an order of 10, 30, 50, 70, 90, etc. the solenoid 111 is not energized and the armature 110 positions switch 56 in contact with the terminal 58 to thereby supply the output from the "even" zero magnetic head 32 to the counter gate 68 of the preset counter 63. In this fashion, the opposite zero magnetic pickup heads 31 and 32 are alternately selected for each succeeding order block.

The coarse position sensor itself consists of what may be considered two sets of bridge circuits, one pair of arms of each bridge is made up of the 10 turn potentiometer 24 on the position scanner 22. For increase tracking, the opposite two bridge arms are made up of an increase tracking potentiometer 115 having a series of ten taps which correspond to the change over voltages of the order blocks in the increase direction (see Fig. 10) and for decrease tracking, potentiometer 115 is replaced in the bridge circuit by decrease tracking potentiometer 116 which is also provided with a series of 10 taps. The taps on decrease tracking potentiometer 116 correspond to the nominal changeover positions for decrease tracking (again see Fig. 10). The potentiometer arms 117 and 113 for the potentiometers 115 and 116, respectively, are ganged to the coarse analog order select switch 52 and the movement of this selector to any particular order sets up the nominal change-over position on the potentiometers 115 and 116 for both increase and decrease tracking. The selection of the appropriate bridge circuit is accomplished by means more fully described below. As illustrated, the order selection is manual but it is contemplated that automatic means, such as punched cards or magnetic tapes, may be used to effect this selection.

When the operation of the apparatus is initiated, the potential of potentiometer arm 29 on the 10 turn potentiometer 24 (which corresponds to the actual carriage position) is compared with the order set on the increase tracking potentiometer 115. If this comparison indicates that potential of arm 29 is below the order, a voltage is applied to the reversible motor 17 to move the lathe carriage 11 toward the proper order until the proper change-over position is reached and the digital control takes over as previously discussed. If the 10 turn potentiometer is above the order, the comparison in the increase tracking bridge circuit does not result in an output voltage from the system but rather a switch over the decrease tracking bridge circuit so that a comparison of the potential of the arm 29 of 10 turn potentiometer 24 with that of the arm 113 on the decrease tracking bridge potentiometer 116 takes place. If this circuit indicates that the voltage of potentiometer 24 is above the order, a voltage is applied to the reversible motor 17 to drive the carriage 11 down to a point where the proper change-over position is set and the fine control again takes over.

The only remaining condition which can occur is where the tool carriage 11 is in the desired order block. For this case a voltage comparison is first made in the increase tracking bridge with no resultant output, a comparison is then made in the decrease tracking bridge with no resultant output, and then the output of the comparator 71 is applied to the amplifier 60 and the fine digital position control adjusts the position of the carriage as previously discussed. The exact manner of accomplishing these functions is described below in connection with the circuit of Fig. 9.

In order to illustrate the method of obtaining the different change-over points for increase and decrease tracking, values are placed on the resistance between taps on the increase and decrease tracking potentiometers 115 and 116. Comparing these values with change-over points shown in Fig. 8, it is seen that for increase tracking the change-over for the zero order block is at zero. The nominal change-over for the second order range (10 to 20 inches) is 7.5 inches and each subsequent change-over point is 10 inches apart; i.e., 17.5, 27.5 inches, etc. Thus, the potentiometer arm 117 at increase tracking potentiometer 115 is set at zero potential for the zero position of the order block selection arm 52, the second position incorporates 750 ohms and each subsequent resistance adds an additional 1000 ohms. These values can be used since the 10 turn sensing potentiometer 24 has a total resistance of 20,000 ohms (1000 ohms per revolution or 100 ohms per inch). Thus for the equivalent of 7.5 inches, 750 ohms may be used and for 10 inches, 1000 ohms may be used.

An inspection of the decrease tracking potentiometer 116 shows that the zero order tap includes 1250 ohms and each subsequent tap adds an additional 1000 ohms. Thus, at 100 ohms per inch it is seen that the decreasing change-over for the zero order block is at 12.5 inches and the change-over for each subsequent order is displaced 10 inches (100 ohms on the potentiometer) therefrom. In order to simplify the description only 90 inches of travel (see taps on tracking potentiometers 115 and 116) rather than the 200 inch travel used.

The sequence of relay operation which gives the inspection sequence described above is provided by the balanced polarized relay 118, direction control relay 119, change-over relay 120, and start relay 121. Polarized relay 118 is a fast acting relay which consists of a magnetic core member 122 with a coil 123 wound thereon and an armature member 124 which is adapted to swing between contacts 125 and 126 depending upon the polarity of the energizing voltage applied to coil 123. If the coil 123 is not energized, the armature 124 remains in the neutral position as illustrated. Each of the relays 119, 120, and 121 are relatively conventional voltage responsive relays having moving armatures 127, 128, and 129 respectively and actuating coils, 130, 131, and 132 respectively which pick up their associated armatures when energized. Direction control relay 119 is provided with four sets of switch members 133, 134, 135, and 136 with associated contacts; change-over relay 120 is provided with three sets of switch members 137, 138, and 55 and their associated contacts; and start relay 121 is also provided with three sets of switch members 140, 141, and 142 with their associated contacts.

An order set switch 165 is provided with a switch member 164 and contact 163. This switch is mechanically connected to order select switch 52 so that it is open when order select switch is being operated. When order set switch is open it prevents the energization of any of the control relays 118, 119, 120, and 121. In this manner order set switch 165 prevents the position control system from trying to follow random settings of the order select switch 52 as it is moved to a new position. In addition, a start or executive switch 143 is provided to initiate operation of the control system. Master switch 143 has two electrically insulated but mechanically ganged switch members 144 and 145. When the master switch 143 is operated, the upper switch 144 is closed on terminal 146 to place the solenoid 123 of polarized relay 118 in the error sensing portion of the increase tracking bridge circuit. This error sensing circuit may be traced from the movable tap 29 on the helical potentiometer 24 through lead 147, solenoid 123, switch arm 144 of master switch 143 (when closed), contact 146, lead 148, lead 149, switch arm 134 of direction control relay 119 and lead 150 to the movable contact arm 117 on increase tracking potentiometer 115. Since the bridge circuits are energized by a potential applied between terminals 151 and 152, the polarized relay 118 is actuated if any error exists between the actual position of the tool carriage 11 as set by potentiometer arm 29 of helical potentiometer 24 and order set on increase tracking potentiometer 117 by order selector switch 52.

Assume first that the tool carriage 11 is below the selected order and therefore the error voltage applied to solenoid 123 of the polarity sensitive relay 118 is energized in such a manner as to cause its armature 124 to close on its contact member 126. At the same time switch arm 145 of master switch 143 is closed on its contacts 153 and 154. This operates to complete electrical circuits which connect the solenoid coils 131 and 132 of change-over relay 120 and start relay 121 respectively between the energizing output terminals 155 and 156 of a transformer 157. The circuit for the solenoid 131 of change-over relay 120 may be traced from transformer output terminal 155, lead 158, through the solenoid 131, lead 159, switch member 136 of direction control relay 119 which is in contact with its lower terminal 136a, terminal 126 and armature 124 of polarity sensitive relay 118, terminal 153 and switch member 145 of master switch 143, and lead 160 to the opposite transformer output terminal 156. The energizing circuit for solenoid 132 of the start relay 121 may be traced again from transformer output terminal 155, through lead 158, solenoid 132, lead 161, contact 154, and switch member 145 of master switch 143 and lead 160 to the opposite input terminal 156.

For the condition just described, the change-over relay 120 and start relay 121 are energized and move their switch members to their upper positions whereby each of these relays seals itself in the electrical circuit so that release of executive switch 143 does not de-energize their respective solenoids 131 and 132. For example, coil 131 of change-over relay 120 is energized through the electrical circuit which includes transformer secondary terminal 155, lead 158, solenoid 131, the lower switch 136 of directional control relay 119, (closed on lower terminal 136a) terminal 126 and armature 124 of polarity sensitive relay 118, lead 162, upper terminal 138b and switch 138 of change-over relay 120, contact 163 and switch member 164 of order set switch 165, and lead 160 to transformer output terminal 156. The circuit of the coil 132 of start relay 121 is sealed in from transformer output terminal 155, lead 158, coil 132, upper terminal 140b and switch 140 of start relay 121, terminal 163 and switch arm 164 of order set switch 165 and lead 162 to transformer output terminal 156. The coil 123 of polarity sensitive relay 118 is also sealed in the circuit by means of the change-over relay 120 through arm 29 of helical potentiometer 24, lead 147, coil 123, lead 166, upper terminal 137b and switch arm 137 of change-over relay 120, lead 149, switch arm 134 and lower contact 134a of direction control relay 119 and lead 150 to potentiometer arm 117 on increase tracking potentiometer 115.

For the condition just described, a voltage is applied to input terminals 171 and 172 which supply amplifier 60 (shown in Fig. 1). This voltage is of a polarity to drive the tool carriage 11 in an increased tracking direction until the potential at arm 29 of the helical potentiometer 24 is balanced against that of the preset increase tracking potentiometer arm 117.

It should be noted that the change-over switch 55 and its associated terminals 57 and 61 referred to in Fig. 1 correspond to the lower switch 55 and its associated contacts 57 and 61 of the change-over relay 120 illustrated in Fig. 9. Switch 55, as previously described, determines whether the comparator output or the coarse analog control output is connected to supply the amplifier 60 and the direction control relay 119 determines the polarity of the voltage applied to amplifier 60 by the coarse control system. When the polarity sensitive relay 118 senses that the coarse control must provide increase tracking of the tool cariage 11, as set up by the relay positions described above, switch 55 of change-over relay 120 is in its upper position. When switch arm 55 is in this position, it connects the output voltage of the coarse analog control 53 to the amplifier 60.

In order to produce an output voltage from the coarse analog control 53, a direct current voltage source is connected between the terminals 173 and 174 which are at opposite ends of a voltage divider 139. The center tap 180 of this divider is connected directly to amplifier supply terminal 171. Direction control relay 119 determines the polarity of the voltage applied between the amplifier input terminals 171 and 172 by the coarse analog control by determining which of the supply terminals 173 and 174 is connected to the opposite output terminal 172. For increase tracking the coil 130 of direction control relay 119 is not energized and, therefore, the switch members 133 through 136, inclusive, are all in their lower positions as illustrated. As a consequence, the negative supply terminal 174 is connected through switch member 135 and its associated lower terminal 135a, lead 175, upper terminal 57, and switch 55 of change-over relay 120, lead 176, and upper terminal 141b and switch 141 of start relay 121 to amplifier input terminal 172. Thus, the upper amplifier input terminal 171 is negative with respect to the lower amplifier input terminal 172 and lathe tool carriage 11 is driven in the direction for increase tracking.

When the error voltage from increase tracking bridge is zero, the order change-over point for the particular order set by order selector switch 52 is reached and there is no voltage applied across coil 123 of polarity sensitive relay 118. Therefore, the armature 125 of polarity sensitive relay 118 moves to its neutral position, breaks contact with terminal 126 and thus de-energizing coil 131 of changeover relay 120 to change the position of switch 55 from upper contact 57 to lower contact 61 thereby connecting the output of comparator circuit 71 to the amplifier 60. This circuit may be traced from comparator output terminal 170 through lower terminal 61 and switch arm 55 of change-over relay 120, lead 176, terminal 141b and switch 141 of start relay 121 to output terminal 172.

If tool carriage 11 is above the order set on order block selector switch 52, the voltage applied to coil 123 of polarity sensitive relay 118 is opposite to that described above and, therefore, the armature 124 is closed against contact 125. Under these circumstances, the coil 131 of change-over relay 120 is not connected to be energized and therefore the change-over relay remains in the position illustrated. However, the coil 132 of the start relay 121 is energized and sealed in the same manner as described above and connects a circuit to energize the coil 130 of direction control relay 119. This circuit may be traced from transformer output terminals 156, lead 160, switch arm 164 and terminal 163 of change order switch 165, lead 177, switch arm 138 and contact 138a of change-over relay 120, switch arm 142 and contact 142b of start relay 121, coil 130 of direction control relay 119, and lead 158 to transformer output terminal 155.

The coil 130 of direction control relay 119 is sealed in by the circuit which may be traced from transformer output terminal 155, lead 158, coil 130, contact 133b and switch arm 133 of direction control relay 119, lead 177, change order switch 165, and lead 160 to the opposite transformer output terminal 156. Since direction control relay 119 is picked up its switch member 134 contacts its upper contact 134b instead of lower contact 134a and, therefore, the previously closed (and traced) circuit from the potentiometer arm 117 on increase track potentiometer 115 through coil 123 of polarity sensitive relay 118 to the potentiometer tap 29 on helical potentiometer 24 is opened and the potentiometer arm 113 on decrease tracking potentiometer 116 is placed in the error sensing arm of the coarse control sensing bridge. Thus, the bridge circuit utilized to provide the error voltage for the coarse control is effectively changed from the increase tracking bridge to the decrease tracking bridge.

If the potentiometer arm 29 on the helical potentiometer 24 is at a potential which is less than that on the decrease tracking potentiometer arm 113, the tool carriage 11 lies within the order band of the selected order block and the voltage applied to the coil 123 of polarity sensitive relay 118 is of such a polarity as to move the armature 124 back to the terminal 126. This still does not complete the energizing circuit of coil 131 of the changeover relay 120, which is broken at terminal 136a of relay 119. Therefore, the switch member 55 of change-over relay remains in its lower position (against contact 61) to connect the output of the comparator circuit 71 to the amplifier 60.

If on the other hand, the arm 29 of the helical potentiometer 24 is at a potential above that of the decrease tracking potentiometer arm 116, the armature 124 of polarity sensitive relay 118 remains positioned in contact with the contact 125. For this condition an energizing circuit is provided to energize the coil 131 of change-over relay 120 from transformer output terminal 155, through lead 158, coil 131, switch member 136 and upper contact 136b of direction control relay 119, contact 125 and switch arm 124 of direction sensitive relay 118, contact 153 and switch arm 145 of master switch 143, and lead 160 to transformer output terminal 156. Once change-over relay 120 is picked up it seals itself in the circuit through its switch arm 138 as previously described and positions switch 55 against contact 57 to connect the output of the coarse analog control circuit 53 to amplifier 60 and drive the tool carriage 11 toward the zero position on lathe bed 13 until the decrease tracking bridge circuit is balanced at a change-over point. Once this condition is reached the armature 24 of the polarity sensitive relay 118 moves to its neutral position causing change-over relay 120 to drop out to again connect the output of comparator circuit 71 to the amplifier 60. Thus, the digital control takes over operation of tool carriage and brings it to the selected position.

It is noted that for decrease tracking, the direction control relay 119 was energized and its switches were therefore in their upper position. As a consequence, the positive side of the unidirectional supply voltage at terminal 173 is applied through upper contact 135b and switch arm 135 of direction control relay 119, upper contact 57 and switch arm 55 of change-over relay 120, and upper contact 141b and switch arm 141 of start relay 121 to the input terminal 172 of amplifier 60. Thus, for this condition terminal 172 is positive with respect to terminal 171. This polarity drives the reversible motor 17 in such a direction as to cause tool carriage 11 to move in the decrease tracking direction.

The above description illustrates the condition where only one carriage position is selected. It is to be understood, however, that the system is particularly adaptable to sequentially positioning the carriage in accordance with an entire program set on cards or tapes.

While a particular embodiment of this invention has been illustrated, it is to be understood that the invention is not limited thereto since many modifications both in the circuit arrangements and in the instrumentalities employed may be made. For example, it is clear that the digital scale may be produced by scanning means such as photoelectric cells rather than the magnetic drum and pickup heads illustrated. It is contemplated that the appended claims will cover any such modifications as fall within the true spirit and scope of this invention.

What we claim as new and desire to secure by Letters Patent of the United States is:

1. A numerical position control system for selecting a desired position of an object and positioning the object accordingly including a pair of bridge circuits for providing an error voltage in accordance with the difference between the actual position of the object and the selected position, one pair of bridge arms common to both bridge circuits, means to determine the relative impedance of said one pair of bridge arms as a function of the position of the object, means to select the relative impedances of each of the opposite pairs of bridge arms as a function of the selected position, switch means to select the bridge circuit utilized in accordance with direction of displacement of the object from the selected position, means responsive to an error voltage from the selected bridge circuit to move the object toward the preselected position until the selected bridge circuit is balanced.

2. In a numerical position control system for providing coincidence between the position of an object and a preset position comprising means to produce a cyclically recurring digital scale, means to produce a reference electrical pulse for each occurrence of said digital scale which reference pulse establishes a relationship of the actual position of the object and said digital scale, means to produce an order electrical pulse for each occurrence of said digital scale which order pulse establishes a relationship between said digital scale and the preset position for said object, means to produce an error voltage having a polarity and magnitude which is a function of the difference between the occurrence of said order and reference pulses relative to said digital scale, and means responsive to said error voltage for moving said object until said reference and order pulses are coincident whereby the position of said object is coincident with the preset position.

3. In a numerical position control system for positioning an object in accord with a preselected position a fixed reference means, movable scale means coupled to the object for relative movement with respect to said fixed reference means whereby the relative positions of said reference and said scale indicate the actual position of the object, scanning means for cyclically scanning said fixed reference means and said scale and producing count electrical pulses and reference electrical pulses corresponding to the relative position of said scale and said reference, means for preselecting the desired position of said object and producing an order electrical pulse coincident with the count electrical pulse which corresponds to the preselected position, comparator means for comparing the occurrence of said reference and order electrical pulses and produce an error voltage which is a function of the relative displacement of said pulses, and means responsive to said error voltage for moving said object until said reference and order pulses are coincident.

4. In a numerical position control system for adjusting the position of a movable object which is capable of movement along a linear path, a fixed reference means, rotary scale means, said rotary scale means being coupled to the movable object whereby the rotary position of said scale means is determined by the linear position of the object, said fixed reference means positioned adjacent said rotary scale means whereby the relative position of said rotary scale and fixed reference are indicative of the actual position of the object, scanning means for cyclically scanning said fixed reference and said scale and producing reference electrical pulses and count electrical pulses indicative of the relative positions of said reference and said scale respectively, means for preselecting the desired position of said object and producing an order pulse coincident with the count electrical pulse which corresponds to the preselected position, comparator means for comparing the occurrence of said reference and order pulses and produce an error voltage which is a function of the relative displacement of said pulses, and means responsive to said error voltage for moving said object until said reference and order pulses are coincident.

5. Apparatus for use in a servo loop for determining the position of an object in accordance with a preset program, means to produce a cyclically recurring digital scale, means to produce a reference electrical pulse for each occurrence of said digital scale which reference pulse establishes a relationship of the actual position of said carriage and said digital scale, means to produce an order electrical pulse for each occurrence of said digital scale which order pulse establishes a relationship between said digital scale and the preset position for said carriage, means to produce an error voltage having a magnitude which is a function of the difference between the occurrence of said order and reference pulses relative to said digital scale.

6. Apparatus for use in a servo loop for determining the position of an object in accordance with a preset program, a fixed reference means, movable scale means coupled to the object for relative movement with respect to said fixed reference means whereby the relative position of said reference and said scale indicate the actual position of the object, scanning means for cyclically scanning said fixed reference means and said scale and producing count electrical pulses and reference electrical pulses corresponding to the relative position of said scale and said reference, means for preselecting the desired position of said object and producing an order electrical pulse coincident with the count electrical pulse which corresponds to the preselected position, comparator means for comparing the occurrence of said reference and order electrical pulses and produce an error voltage which is a function of the relative displacement of said pulses.

7. Apparatus for use in a servo loop for adjusting the position of a movable object which is capable of movement along a linear path, a fixed reference means, rotary scale means, said rotary scale means being coupled to the movable object whereby the rotary position of said scale means is determined by the linear position of the object, said fixed reference means positioned adjacent said rotary scale means whereby the relative position of said rotary scale and fixed reference are indicative of the actual position of the object, scanning means for cyclically scanning said fixed reference and said scale and producing reference electrical pulses and count electrical pulses indicative of the relative position of said reference and said scale, respectively, means for preselecting the desired position of said object and producing an order pulse coincident with the count electrical pulse which corresponds to the preselected position, comparator means for comparing the occurrence of said reference and order pulses and producing an error voltage which is a function of the relative displacement of said pulses.

8. In a position control system for selecting a desired position of an object and positioning the object accordingly, a coarse analog position servo loop including a pair of bridge circuits for providing an error voltage in accordance with the difference between the actual position of the object and the selected position, one pair of bridge arms common to both bridge circuits, means to determine the relative impedance of said one pair of bridge arms as a function of the position of the object, means to select the relative impedances of each of the opposite pairs of bridge arms as a function of the selected position, switch means to select the bridge circuit utilized in accordance with direction of displacement of the object from the selected position, a digital servo loop including means to produce a digital scale, means to produce a reference electrical signal indicative of the actual position of said object relative to said digital scale, means to produce an order electrical signal which is related to said digital scale in a manner to indicate the preselected digital position of the object, means to produce an electrical error voltage which is a function of the difference between the position of the object and the preset position, a common drive element selectively forming a part of each of said analog and digital servo loops for positioning the object in accordance with any error potential applied thereto, and switch means responsive to the position of the object to selectively connect said common drive element to be responsive to the error potential developed in one of said servo loops in response to the actual position of the object relative to the preselected position.

9. A position control system for determining the position of an object in accordance with a preselected position including a coarse analog positioning servo loop for positioning the object within a predetermined range of positions which includes the preselected position, said analog servo loop having a means to provide a position potential which varies in an analog manner with variations in the position of the object, means to produce a reference potential indicative of the preselected position, means to produce an error potential in accordance with the difference between the position potential and the reference potential, a fine digital servo loop including means to produce a digital scale, means to produce a reference electrical signal indicative of the actual position of said object relative to said digital scale, means to produce an order electrical signal which is related to said digital scale in a manner to indicate the preselected digital position of the object, means to produce an electrical error voltage which is a function of the difference between the position of the object and the preset position, a common drive element selectively forming a part of each of said analog and digital servo loops for positioning the object in accordance with any error potential applied thereto, and switch means responsive to the position of the object to selectively connect said common drive element to be responsive to the error potential developed in one of said servo loops in response to the actual position of the object relative to the preselected position.

10. A position control system for determining the position of an object in accordance with a preselected position including a coarse analog positioning servo loop for positioning the object within a predetermined range of positions which includes the preselected position, including a pair of bridge circuits for providing an error voltage in accordance with the difference between the actual position of the object and the selected position, one pair of bridge arms common to both bridge circuit, means to determine the relative impedance of said one pair of bridge arms as a function of the position of the object, means to select the relative impedances of each of the opposite pairs of bridge arms as a function of the selected position, switch means to select the bridge circuit utilized in accordance with direction of displacement of the object from the selected position, a fine digital servo loop including means to produce a digital scale, means to produce a reference electrical signal indicative of the actual position of said carriage relative to said digital scale, means to produce an order electrical signal which is related to said digital scale in a manner to indicate the preselected digital position of the object, means to produce an electrical error voltage which is a function of the difference between the position of the object and the preset position, a common drive element selectively forming a part of each of said analog and digital servo loops for positioning the object in accordance with any error potential applied thereo, and switch means responsive to the position of the object to selectively connect said common drive element to be responsive to the error potential developed in one of said servo loops in response to the actual position of the object relative to the preselected position.

References Cited in the file of this patent

UNITED STATES PATENTS

| | | |
|---|---|---|
| 2,537,427 | Seid et al. | Jan. 9, 1951 |
| 2,543,950 | Yardney et al. | Mar. 6, 1951 |
| 2,566,831 | Grosdoff | Sept. 4, 1951 |
| 2,666,170 | Davis | Jan. 12, 1954 |
| 2,738,493 | Mesh | Mar. 13, 1956 |
| 2,792,545 | Kamm | May 14, 1957 |
| 2,808,548 | Spencer | Oct. 1, 1957 |
| 2,849,668 | Tripp | Aug. 26, 1958 |

FOREIGN PATENTS

| | | |
|---|---|---|
| 758,846 | Great Britain | Oct. 10, 1956 |